Oct. 25, 1938. J. B. BAMBENEK ET AL Re. 20,892

TRACTION INCREASING DEVICE Orig. 2,092,823

Original Filed May 13, 1936

Inventors
JOSEPH B. BAMBENEK
DOMINIC C. BAMBENEK
By Paul H. Moore
ATTORNEYS

Reissued Oct. 25, 1938

Re. 20,892

UNITED STATES PATENT OFFICE 20,892

TRACTION-INCREASING DEVICE

Joseph B. Bambenek and Dominic C. Bambenek, Winona, Minn., assignors to Peerless Chain Company, Winona, Minn., a corporation of Minnesota Original No. 2,092,823, dated September 14, 1937, Serial No. 79,528, May 13, 1936. Application for reissue November 8, 1937, Serial No. 173,490

11 Claims. (Cl. 152—243)

This invention relates generally to traction-increasing devices and particularly to anti-skid chains used in conjunction with automobile wheels and tires as part of an emergency unit.

The form of the chain shown in the drawing is generally like that disclosed in Gahring Patent No. 1,296,069 of March 4, 1919, wherein the links are formed of a single piece of bent wire and comprise an upper body portion and underlying ground engaging members meeting the body portion in inter-link-connecting loops and welded adjacent their outer ends to overlying parts of the body portion, but the present invention, although an improvement over the structure of that patent, is not entirely limited to the type of link of that structure, because this invention gives substantially improved results over the Gahring structure from the standpoint of traction ability.

In the Gahring patent, the chain is flat and provides no traction elements other than the flat faces of the links, and therefore that chain is relatively poor in tractive ability. Among other things, the present invention provides irrespective of the form of chain, a structure for giving unusual tractive ability, by providing elements which extend laterally and are directed groundward to provide digging edges formed by cutting a cylindrical chain-forming stock.

An object of the invention is to substantially increase the traction ability of the chain of the type shown in said Gahring patent by the simple expedient of bending the links on a line which passes through the inter-link-connecting loops, to make the chain concave on its ground-facing side, whereby the terminals of the side-forming portions of the links are disposed nearer to the ground than any other parts of the links.

Another object of the invention which is independent of and broader than the improvement on the Gahring structure, is the provision of traction-increasing elements which are arranged in any suitable manner to extend laterally and downwardly and to provide terminal edges which act to increase traction.

Another object is to arrange the elements at only a slight angle with the surface with which they are in traction relation.

Features relate: to the arrangement of the traction-increasing extensions obliquely to the longitudinal axis of the chain; to the use of substantially straight extensions; to the provision of terminal circumferential edges acting to increase traction; to the arrangement of the extensions to define a ground-facing concavity; to the scheme of making chains in rights and lefts and applying them for the purpose of preventing drift when the chains are in use on the driving wheels of an automobile; and to all broader ideas of means inherent in the disclosure.

Objects, features and advantages of the invention will be set forth in the description of the drawing forming a part of this application, and in said drawing Figure 1 shows my improved chain in tangent relation to the tread of a tire of a driven wheel of an automobile and viewing the ground-facing side to show the angular relations of the traction-increasing elements;

Figure 1:
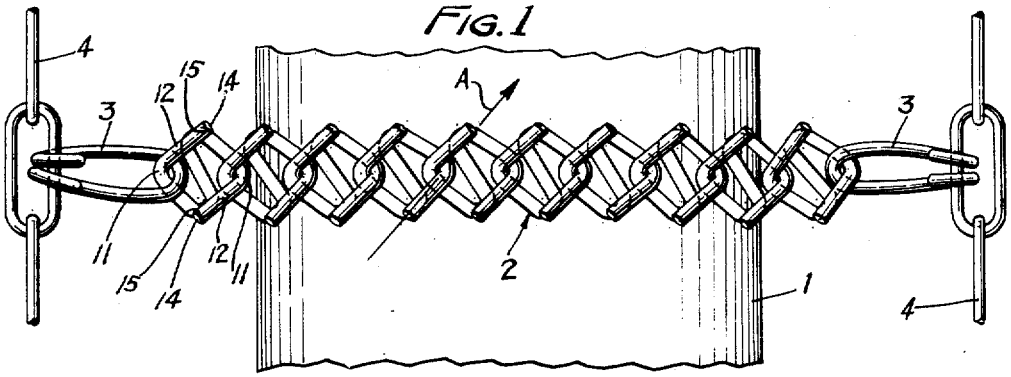
Figure 3:
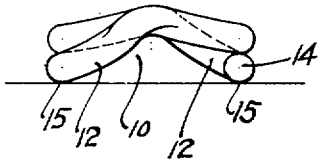
Figure 3 is an end view of one of the links illustrating the traction action.
Figure 5:
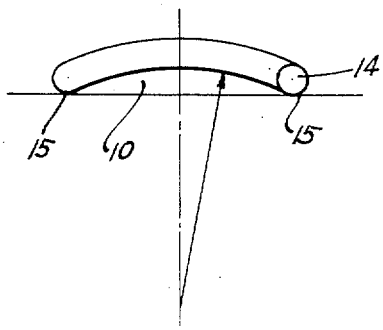
Figure 5 is a view diagrammatically illustrating the ground-facing concavity and the relation of the terminals of the traction-increasing extensions with the ground.

Referring to Figure 1, numeral 1 indicates the tire of one drive wheel of an automobile, transversely of which the traction chain of this invention is arranged in tangent relation, preparatory to securing it for operation. The chain is generally indicated at 2, and has at opposite ends suitable links 3 connecting it with any suitable form of lateral chain 4 well known to this art. This chain 2 is composed of links each arched transversely, see Figures 3 and 5, to provide a ground-facing concavity 10. We call the link "arched" because the traction-increasing elements or extensions, or spikes, of this invention, are so arranged that when their outer ends are contacting the ground, they form a transverse arch. This feature is independent of the particular form of chain.

In this instance, each link has a substantially square contour in plan, but may have other shapes. Although this contour is claimed specifically there is no intention to be entirely limited to any particular contour since the gist of the invention is the arrangement whereby the ends of certain extensions are made to act to increase traction.

Figure 4:
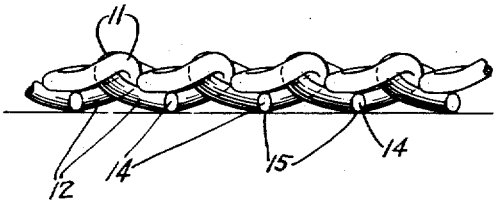
Figure 4 is a side or edge view of the links also illustrating the traction action.

In this instance, each link is formed from a single piece of cylindrical stock and provides two inter-link-connecting loops 11 merging in two (in this instance) substantially straight traction-increasing extensions, or side members, 12 which underlie portions of the link body provided between end loops 11. These extensions, as clearly indicated in Figures 1 and 4, are directed laterally in opposite directions from a line passing through the longitudinal middle of the chain (or of the loops) to slope gradually toward the ground so that a plane tangent to the ground-facing peripheries of these extensions or spikes defines or presents the transverse ground-facing concavity 10.

Each of the spikes has a flat terminal face 14 which forms with the cylindrical surface of the wire or stock, a traction-increasing edge 15. By this means maximum traction on ice, etc., with minimum of injury to paved roads is obtainable. The arrangement of the extensions giving a lateral and groundward thrusting action is broadly claimed.

Figure 2:
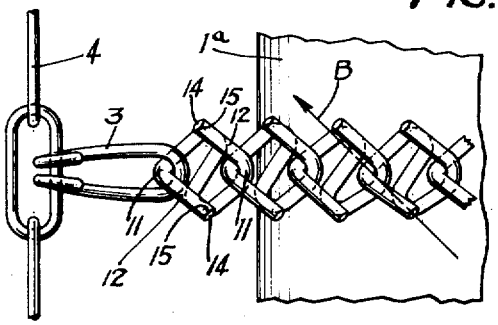
Figure 2 is a fragmentary view similar to Figure 1, but showing the opposite driven wheel of the same automobile, and illustrating the "rights" and "lefts", or reversed relation of the traction-increasing elements.

Another feature of this invention relates to the use of the chains on the driving wheels of an automobile in such manner as to avoid lateral drift of the wheels such as ordinarily occurs when chains of the ordinary types are used. We avoid this drifting by forming the chains in what may be designated "rights" and "lefts". Referring first to Figure 1, it will be noted that contiguous extensions of the spikes of adjacent links extend in the direction of the arrow A, while in Figure 2 the spikes extend in direction of the arrow B, or in direction opposite to that of arrow A. If numeral 1 indicates the wheel or tire of one traction wheel and numeral $1^a$ indicates the wheel or tire of the opposite drive wheel, it can be easily seen that drifting will be avoided, as a result of the arrangement which we have described, since the traction-increasing elements of one side are oblique to the line of travel in opposite directions.

Irrespective of the particular form of chain, we believe we are the first to conceive of forming the links of a single length of stock and to provide outwardly and groundwardly directed digging edges.

As an improvement on Gahring, we have produced a concavity on the ground-engaging side which causes the extensions to slant downwardly toward the ground rather than to lie parallel with the ground. We believe we are the first to make any link, however constructed, which will provide digging extensions, extending in opposite directions in the manner diagrammatically shown in Figure 4 and as diagrammatically shown in Figure 3.

We are aware that many shanks for this purpose have been made, but none, so far as we are aware, are made from a single length, nor made to provide the downwardly laterally extending digger extensions, nor to provide digger extensions which make an angle of substantially 90° with the longitudinal middle of the chain, nor in which each link in plan is substantially square.

In various types of chains increase of the tractive force has been attempted by soldering short lengths of metal onto the links, but in practically all these cases it is the cylindrical surface which is supposed to act to increase the traction, and these cylindrical surfaces engage flatly against the ground or ice.

We claim as our invention:

1. A non-skid link formed from a single piece of wire to have double approximately triangular loops and approximately parallel and straight side members which are on the ground-facing side of the link and which extend diagonally outwardly in opposite directions and have ground-engaging end faces in part defining digger edges, the side members being welded to the extended angles of said triangular loops, said loops being so bent as to dispose the edges of said straight side members for digging into the ground.

2. A non-skid chain made up of interlocking wire links, said links being formed with double approximately triangular loops and with approximately parallel side members having ground-engaging end faces, said faces defining with the wire circular digging edges, the side members being welded to the extended angles of said triangular loops, the loops of each link being so bent as to cooperate to provide a ground-facing arch transverse to the direction of travel and to position said edges for digging into the ground.

3. A non-skid chain composed of links each of which is bent longitudinally to provide a ground-facing arch transverse to the direction of travel, each link being formed from a single piece of stock of uniform diameter throughout and each having two substantially straight digger elements extending diagonally in opposite directions from the longitudinal middle of the link and pointing toward the ground, each extension being welded near its outer terminal portion to another part of the link.

4. A non-skid link composed of a single piece of wire with the wire of uniform diameter throughout, said link being formed with double approximately triangular loops and with approximately parallel side members having groundwardly extending free ends when both members are on the ground, the side members being welded to the extended angles of said triangular loops, said loops of the link being bent to cooperate to provide a ground-facing arch transverse to the direction of travel and so as to position said free ends of said side members for digging into the ground.

5. A non-skid link formed of a single piece of wire to have an upper body portion and lower members which extend outwardly in opposite directions and have ground-engaging outer ends, the lower members extending in crosswise relation beneath, and being braced from above by, parts of the upper body portion, the body portion being bent longitudinally to arched form so as to incline the outer ends of the lower members downwardly in oppositely inclined directions.

6. A non-skid link formed of a single piece of wire to have an arched upper body portion concave at its underface and oppositely extending underlying side members having ground-engaging outer ends, the side members adjacent their outer ends being welded to the underface of the body portion and through the arching of the body portion being inclined downwardly in opposite directions to project their outer ends towards the ground.

7. A non-skid link formed of a single piece of wire to have an upper body portion and oppositely extending spaced lower members having ground-engaging outer ends, the body portion having leg members which extend cross-wise between and connect the lower members, the leg members of the body portion being bent to arched form with a concave underface so as to cause the lower members to be projected downwardly in oppositely inclined directions.

8. A non-skid link formed of a single piece of wire to have an upper body portion and underlying oppositely extending lower members having ground-engaging outer ends, the body portion having loops at the opposite ends of the link and connecting through such end loops with the inner ends of the lower members, the body portion having intermediate looped parts which overlie and connect with the lower members adjacent their ground-engaging outer ends, the body portion being arched to project the outer ends of the lower members downwardly in oppositely inclined directions.

9. A non-skid link formed of a single piece of wire to have an upper body portion and lower members merging with the body portion at the opposite longitudinal ends of the link, said lower side members extending beneath and being supported against the undersurface of intermediate parts of the body portion, the lower members having ground-engaging outer ends which extend outwardly in opposite directions at an angle to the longitudinal middle line of the link, the body portion being bent to arched form and concave at its underface, the arching of the body portion extending diagonally to the directions of the ground-engaging outer ends of the lower members and causing said outer ends to be projected downwardly along oppositely inclined lines.

10. A non-skid link formed of a single piece of wire to have an upper body portion terminating in inter-link-connecting loops at the longitudinal ends of the link, and lower members connecting with the end loops of the body portion and having ground-engaging outer ends which project outwardly in opposite directions, the lower members extending beneath and engaging parts of the body portion intermediate the end loops, the body portion being bent longitudinally to arched form and being concave at its underface, the arching of the body portion causing the ground-engaging outer ends of the lower members to project downwardly in oppositely inclined directions and disposing the inter-link-connecting end loops in spaced relation above the plane of ground engagement defined by said outer ends of the lower members.

11. A non-skid chain made up of interlocking wire links, the individual links being formed of a single piece of wire and comprising an upper body portion having loops at its opposite ends interconnected with corresponding end loops of adjacent links, and lower side members underlying the body portion and at their inner ends merging with the end loops of the body portion, the side members having ground-engaging outer ends extending outwardly in opposite directions from the longitudinal line of the chain, and the side members adjacent said outer ends being welded to overlying parts of the body portion, the body portion being bent longitudinally to arched form and concave at its underface so as to project the outer ends of the lower side members downwardly in oppositely inclined directions.

JOSEPH B. BAMBENEK.
DOMINIC C. BAMBENEK.